United States Patent
Dalsgaard et al.

(10) Patent No.: US 11,477,637 B2
(45) Date of Patent: Oct. 18, 2022

(54) COMMUNICATION SYSTEM

(71) Applicant: NOKIA SOLUTIONS AND NETWORKS OY, Espoo (FI)

(72) Inventors: Lars Dalsgaard, Oulu (FI); Elena Virtej, Espoo (FI); Jari Petteri Lunden, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 580 days.

(21) Appl. No.: 16/336,530

(22) PCT Filed: Sep. 26, 2016

(86) PCT No.: PCT/EP2016/072856
§ 371 (c)(1),
(2) Date: Mar. 26, 2019

(87) PCT Pub. No.: WO2018/054503
PCT Pub. Date: Mar. 29, 2018

(65) Prior Publication Data
US 2021/0289349 A1    Sep. 16, 2021

(51) Int. Cl.
*H04W 8/26* (2009.01)
*H04W 16/32* (2009.01)

(52) U.S. Cl.
CPC ............ *H04W 8/26* (2013.01); *H04W 16/32* (2013.01)

(58) Field of Classification Search
CPC ......... H04W 8/26; H04W 8/24; H04W 16/32; H04W 16/04; H04W 16/06; H04W 36/00; H04W 36/08; H04W 48/10; H04W 84/04
See application file for complete search history.

(56) References Cited

U.S. PATENT DOCUMENTS

| 8,155,023 B2 * | 4/2012 | Vedantham | H04W 28/26 370/336 |
| 9,414,228 B2 * | 8/2016 | Deshpande | H04W 84/045 |

(Continued)

FOREIGN PATENT DOCUMENTS

| CN | 102067664 A | 5/2011 |
| CN | 103702320 A | 4/2014 |

(Continued)

OTHER PUBLICATIONS

International Search Report and Written Opinion dated Jun. 14, 2017 corresponding to International Patent Application No. PCT/EP2016/072856.

(Continued)

*Primary Examiner* — Khawar Iqbal
(74) *Attorney, Agent, or Firm* — Squire Patton Boggs (US) LLP

(57) ABSTRACT

There is disclosed an apparatus comprising: at least one processor; and at least one memory comprising computer code that, when executed by the at least one processor, causes the following to be performed by the apparatus: reserve a plurality of identifiers for a user apparatus, each of said plurality of identifiers being suitable for addressing the user apparatus within at least one cell controlled by the network apparatus; and transmit an indication of at least one of said plurality of identifiers to the user apparatus.

8 Claims, 6 Drawing Sheets

(56) References Cited

U.S. PATENT DOCUMENTS

| | | | |
|---|---|---|---|
| 2007/0002812 A1* | 1/2007 | Malkamaki | H04W 8/26 |
| | | | 370/338 |
| 2007/0265012 A1 | 11/2007 | Sorbara et al. | |
| 2010/0093354 A1* | 4/2010 | Agashe | H04W 36/04 |
| | | | 455/436 |
| 2010/0254329 A1 | 10/2010 | Pan et al. | |
| 2011/0194514 A1 | 8/2011 | Lee et al. | |
| 2015/0312752 A1* | 10/2015 | Uchino | H04W 16/02 |
| | | | 370/329 |
| 2017/0181057 A1* | 6/2017 | Kishiyama | H04W 48/10 |
| 2017/0325279 A1* | 11/2017 | Grant | H04W 76/19 |
| 2018/0213563 A1* | 7/2018 | Yang | H04W 74/0808 |
| 2019/0029031 A1* | 1/2019 | Kumar | H04W 72/1284 |
| 2019/0268948 A1* | 8/2019 | Hwang | H04W 74/0833 |
| 2019/0386797 A1* | 12/2019 | Yang | H04W 72/0446 |
| 2020/0275403 A1* | 8/2020 | Lee | H04J 11/00 |
| 2020/0358568 A1* | 11/2020 | Nishio | H04W 72/0473 |
| 2021/0014649 A1* | 1/2021 | Maeda | H04W 4/08 |
| 2021/0014909 A1* | 1/2021 | Kim | H04W 48/08 |

FOREIGN PATENT DOCUMENTS

| | | | | |
|---|---|---|---|---|
| CN | 105580485 A | | 5/2016 | |
| EP | 2 879 456 A1 | | 6/2015 | |
| EP | 2 947 934 A1 | | 11/2015 | |
| EP | 2947934 A1 | * | 11/2015 | .......... H04W 74/085 |

OTHER PUBLICATIONS

Notification of the First Office Action dated May 24, 2021 corresponding to Chinese Patent Application No. 2016800910023, with English Summary.

Fujitsu, "RNTI allocation for dual connectivity," 3GPP R2-134001, 3GPP TSG-RAN WG2 Meeting #84, San Francisco, CA, USA, Nov. 15, 2013.

* cited by examiner

COMMUNICATION SYSTEM

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE) or as a user apparatus. Throughout the following, these terms will be used interchangeably. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. LTE is being standardized by the 3rd Generation Partnership Project (3GPP).

In order to increase the available spectrum, it has been proposed to use the unlicensed spectrum using for example some aspects of UTRAN and/or LTE technology.

SUMMARY

According to a first aspect, there is provided an apparatus comprising: at least one processor; and at least one memory comprising computer code that, when executed by the at least one processor, causes the following to be performed by the apparatus: reserve a plurality of identifiers for a user apparatus, each of said plurality of identifiers being suitable for addressing the user apparatus within at least one cell controlled by the network apparatus; and transmit an indication of at least one of said plurality of identifiers to the user apparatus.

The executed computer code may further cause the apparatus to: when reserving said plurality of identifiers, reserve identifiers in a plurality of cells controlled by the network apparatus.

At least one of the identifiers reserved for the plurality of cells controlled by the network apparatus may not identify the user apparatus within every cell controlled by the network apparatus.

At least one of the identifiers reserved for the plurality of cells controlled by the network apparatus may identify the user apparatus at a particular operating frequency of the plurality of cells, such that the same identifier may be used to address the user apparatus in the plurality of cells.

The executed computer code may further causes the apparatus to: determine that the user apparatus requires an identifier for being addressed in a particular cell by the network apparatus; and perform said reserving in response to said determination.

The executed computer code may further cause the apparatus to: receive a request for a radio resource control connection prior to said determining; and perform said determining in dependence on the received request.

According to a second aspect, there is provided a user apparatus comprising: at least one processor; and at least one memory comprising computer code that, when executed by the at least one processor, causes the following to be performed by the apparatus: receive at least one indication from a network apparatus indicating a plurality of identifiers for identifying the user apparatus and/or transmissions intended for the user apparatus within at least one cell controlled by the network apparatus; and use at least one of said plurality of identifiers for identifying the user apparatus and/or transmissions intended for the user apparatus within one or more of the cell controlled by the network apparatus.

The executed computer code may further cause the apparatus to: use at least one of said plurality of identifiers for identifying the user apparatus within a cell controlled by the network apparatus.

The executed computer code may further cause the apparatus to: use at least one of said plurality of identifiers for identifying the user apparatus within a plurality of cells controlled by the network apparatus.

According to a third aspect, there is provided a network apparatus comprising: at least one processor; and at least one memory comprising computer code that, when executed by the at least one processor, causes the following to be performed by the apparatus: receive at least one indication from another network apparatus indicating a plurality of identifiers for identifying a user apparatus within at least one cell controlled by the another network apparatus; and use at least one of said plurality of identifiers for identifying the user apparatus within a coverage area of the cell controlled by the network apparatus.

According to a fourth aspect, there is provided a method comprising: reserving a plurality of identifiers for a user apparatus, each of said plurality of identifiers being suitable for addressing the user apparatus within at least one cell controlled by the network apparatus; and transmitting an indication of at least one of said plurality of identifiers to the user apparatus.

The reserving may comprise: reserving identifiers in a plurality of cells controlled by the network apparatus.

At least one of the identifiers reserved for the plurality of cells controlled by the network apparatus may not identify the user apparatus within every cell controlled by the network apparatus.

At least one of the identifiers reserved for the plurality of cells controlled by the network apparatus may identify the user apparatus at a particular operating frequency of the plurality of cells, such that the same identifier may be used to address the user apparatus in the plurality of cells.

The method may further comprise: determining that the user apparatus requires an identifier for being addressed in a particular cell controlled by the network apparatus; and performing said reserving in response to said determination.

The method may further comprise: receiving a request for a radio resource control connection prior to said determining; and performing said determining in dependence on the received request.

According to a fifth aspect, there is provided a method comprising: receiving at least one indication from a network apparatus indicating a plurality of identifiers for identifying the user apparatus and/or transmissions intended for the user apparatus within at least one cell controlled by the network apparatus; and using at least one of said plurality of identifiers for identifying the user apparatus and/or transmissions intended for the user apparatus within one or more of the cell controlled by the network apparatus.

The method may further comprise: using at least one of said plurality of identifiers for identifying the user apparatus within a cell controlled by the network apparatus.

The method may further comprise: using at least one of said plurality of identifiers for identifying the user apparatus within a plurality of cells controlled by the network apparatus.

According to a sixth aspect, there is provided a method comprising: receiving at least one indication from another network apparatus indicating a plurality of identifiers for identifying a user apparatus within at least one cell controlled by the another network apparatus; and using at least one of said plurality of identifiers for identifying the user apparatus within a coverage area of the cell controlled by the network apparatus.

According to a seventh aspect, there is provided a computer program product comprising computer executable instructions which, when executed by a computer, cause the computer to perform each of the method steps of any of claims 11 to 16, 17 to 19 or claim 20.

According to an eighth aspect, there is provided an apparatus comprising: means for reserving a plurality of identifiers for a user apparatus, each of said plurality of identifiers being suitable for addressing the user apparatus within at least one cell controlled by the network apparatus; and means for transmitting an indication of at least one of said plurality of identifiers to the user apparatus.

According to a ninth aspect, there is provided a user apparatus comprising: means for receiving at least one indication from a network apparatus indicating a plurality of identifiers for identifying the user apparatus and/or transmissions intended for the user apparatus within at least one cell controlled by the network apparatus; and means for using at least one of said plurality of identifiers for identifying the user apparatus and/or transmissions intended for the user apparatus within one or more of the cell controlled by the network apparatus.

According to a tenth aspect, there is provided a network apparatus comprising: means for receiving at least one indication from another network apparatus indicating a plurality of identifiers for identifying a user apparatus within at least one cell controlled by the another network apparatus; and means for using at least one of said plurality of identifiers for identifying the user apparatus within a coverage area of the cell controlled by the network apparatus.

DESCRIPTION OF FIGURES

Embodiments will now be described, by way of example only, with reference to the accompanying Figures in which.

DETAILED DESCRIPTION

In general, the following relates to providing a mechanism for addressing a user apparatus (also referred to herein as a UE) in a network that may allow network resources to be used more efficiently relative to other addressing mechanisms.

In one aspect, a network apparatus is configured to reserve a plurality of identities for a particular user apparatus to be addressed within a cell at least partially controlled by the network apparatus. In particular, a network apparatus is configured to cause a user apparatus to be contemporaneously assigned a plurality of identifiers for being addressed by at least one other network apparatus having a coverage area at least partially overlapping a coverage area (cell) controlled (or otherwise effectuated) by the network apparatus. What is meant by the term coverage area is later discussed.

The assigned identifiers may be dedicated for a particular user apparatus within an operating frequency or a range of operating frequencies of the at least one cell at least partially located within a coverage area of the network-controlled cell. In other words, the user apparatus may be uniquely identified within a particular operating frequency or a range of operating frequencies of a cell located in a network-controlled cell using one of the reserved identifiers. The plurality of reserved identifiers may therefore be considered to be dedicated identifiers of the user apparatus.

The application (or use) of each reserved identifier within the network controlled cell may be different to the application of the other reserved identifiers within that cell. For example, one of the assigned identifiers may only be used within a single cell located within the network-controlled cell. Another of the assigned identifiers may be used only within a group of cells (or only within a different single cell) located within the network-controlled cell. An assigned identifier may also be reserved for a particular frequency or frequency range within the cell/group of cells. An assigned identifier may also be reserved for a particular frequency or frequency range.

By arranging a network apparatus to have multiple dedicated identifiers reserved for a user apparatus contemporaneously, efficiencies in network resources may be achieved, as individual ones of those identifiers may be implemented for specific purposes and/or specific groups of cells (where a group may be one or more).

Before explaining in detail the examples, certain general principles of a wireless communication system and mobile communication devices are briefly explained with reference to FIGS. 1 to 2 to assist in understanding the technology underlying the described examples.

Figure 1:
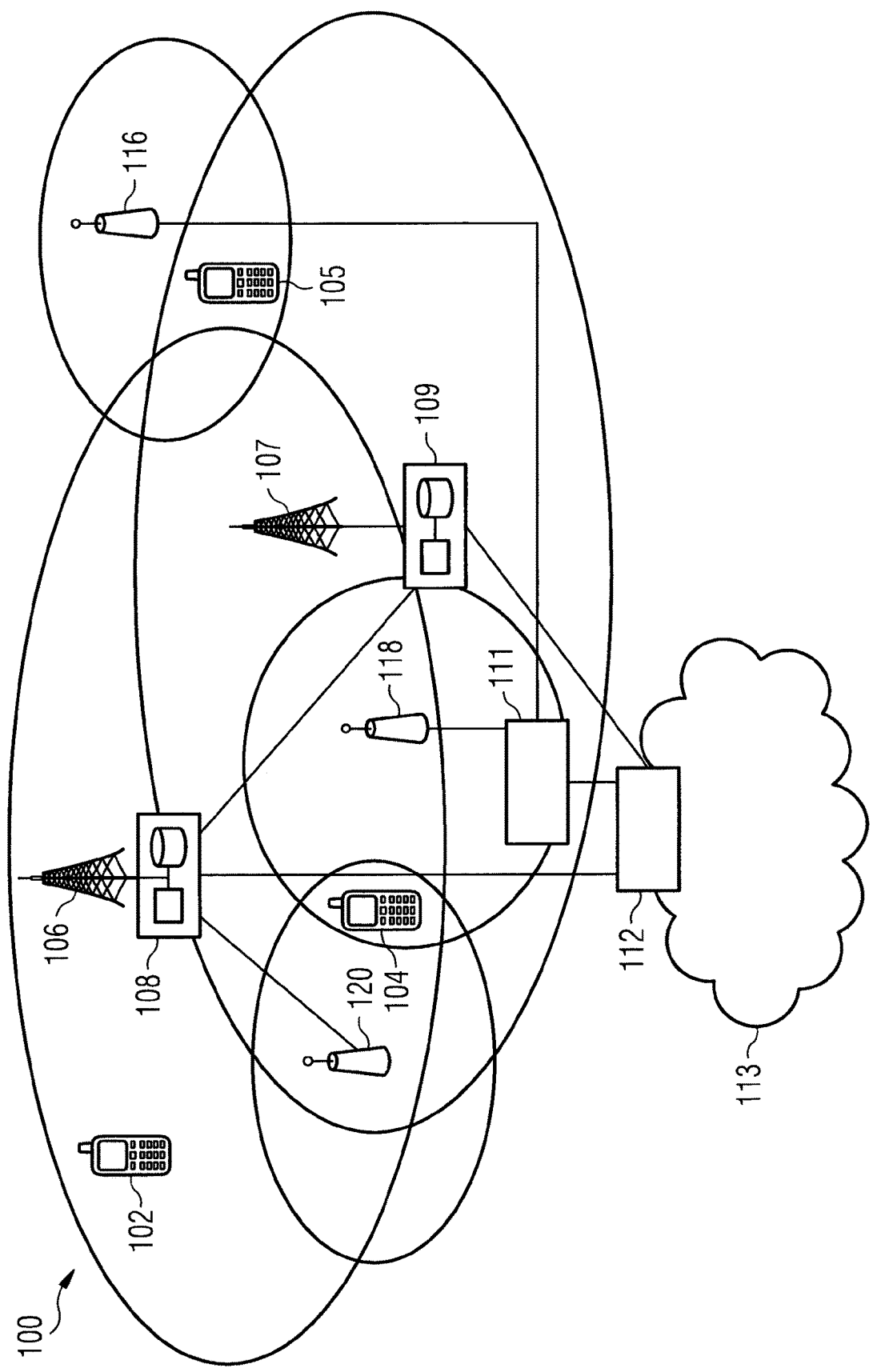
FIG. 1 shows a schematic diagram of an example communication system comprising a plurality of base stations and a plurality of communication devices.

In a wireless communication system 100, such as that shown in FIG. 1, mobile communication devices or user apparatus (UE) 102, 104, 105 are provided wireless access via at least one base station or similar wireless transmitting and/or receiving node or point. A base station is referred to as an eNodeB B (eNB) in LTE. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each user apparatus is served by only one MME and/or S-GW at a time and the (e) NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
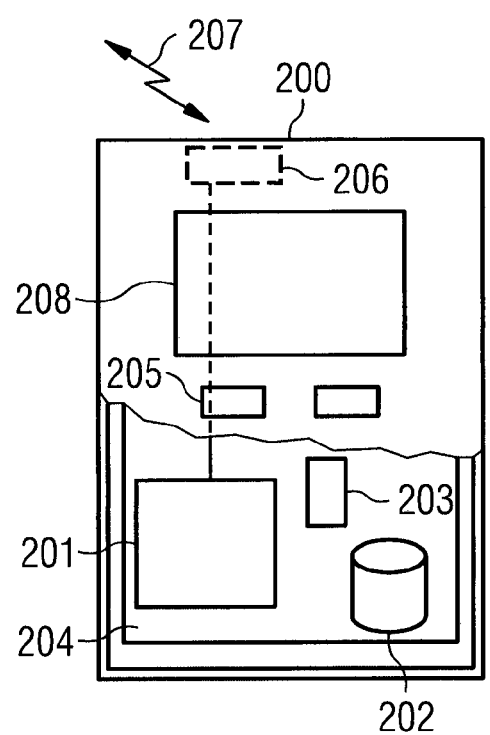
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user apparatus (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by in reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) or LTE Advanced Pro of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Currently, the use of small cells (such as femto cells, pico cells, etc.) located within the coverage area of a macro cell is being explored for providing various functions.

One example of a small cell scenario is an ultra-dense network (UDN) scenario. 3GPP Release 14 of LTE discusses UDNs, which is a small cell proposal in which small cells are deployed in an ultra-dense manner (i.e. where a number of cells are substantially co-located and/or relatively close to each other given the distribution of cells in the network as a whole). The UDNs may comprise ultra-dense small cells, ultra-dense device to device networks (D2D), (to some extent) ultra-dense macros, or a combination thereof. This type of network is further discussed in the 3GPP technical release TR 38.913.

The small cell scenarios may also include multiple layers. This principle of different layers of a cell is illustrated with respect to FIG. 3.

Figure 3:
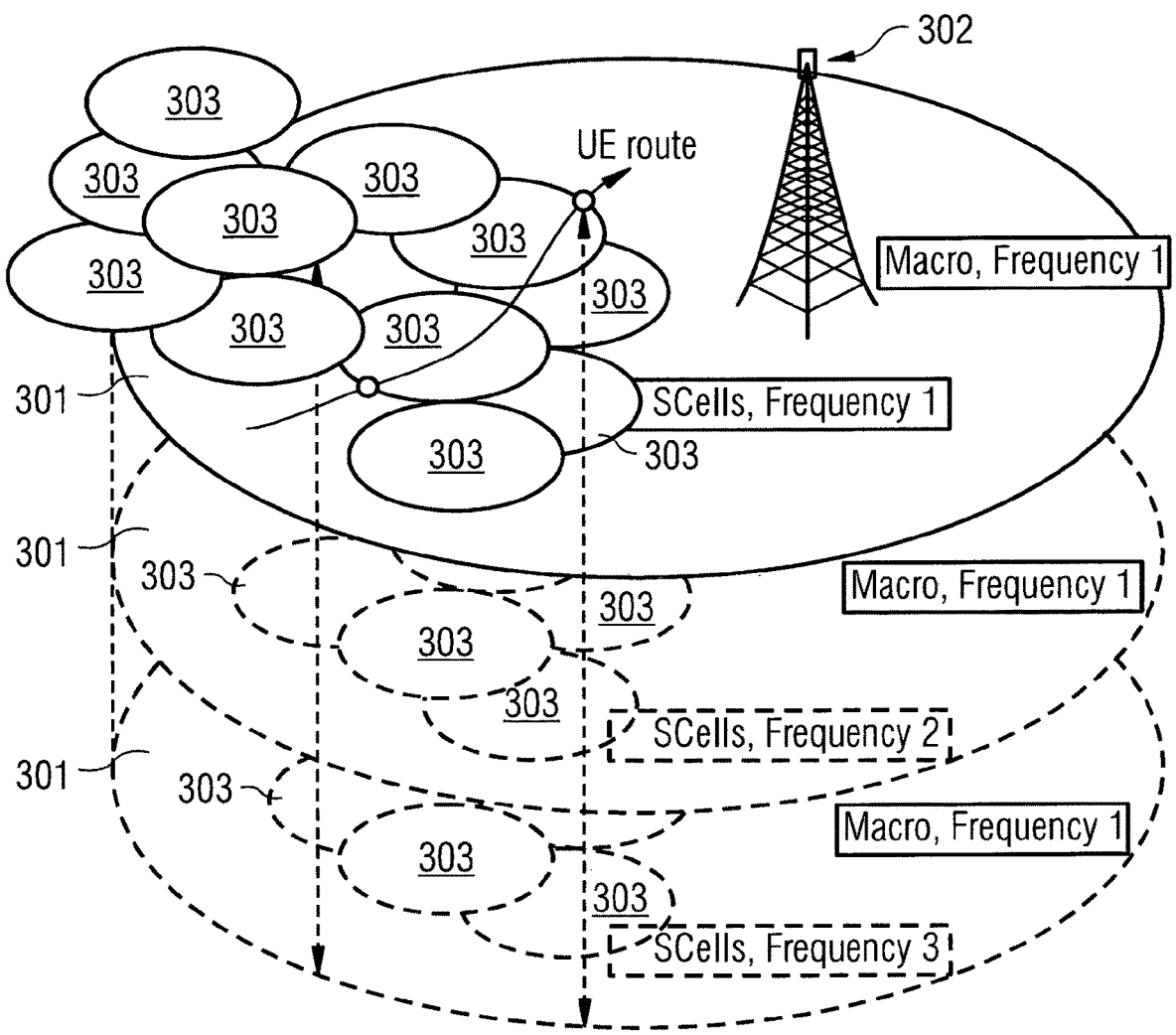
FIG. 3 shows a schematic diagram of an example communication system.

FIG. 3 illustrates three layers over which a macro cell 301 has coverage. The macro cell is represented by the largest oval shown in FIG. 3, and represents the coverage of the macro cell 301 (also called a Primary cell, Pcell) provided by the base station 302 (also known as an access point or eNB). In the depicted example of FIG. 3, the macro cell 301 is configured to operate on the same macro frequency across all three layers of FIG. 3. There is depicted a separate macro cell for each layer.

In each of the three layers of FIG. 3, there is provided a plurality of small cells 303 (also called Secondary Cells, SCells), with the coverage of each cell 303 depicted by a respective oval. Each of the plurality of small cells 303 has at least a portion of the coverage they provide located within the coverage provided by the macro cell 301. At least some of the plurality of small cells 303 are shown to have overlapping coverage areas with others of the plurality of small cells. In the first (top) layer shown in FIG. 3, the plurality of small cells are configured to operate at a first frequency. In the second (middle) layer shown in FIG. 3, the plurality of small cells are configured to operate at a second frequency. In the third (bottom) layer shown in FIG. 3, the plurality of small cells are configured to operate at a third frequency. Each of the first to third frequencies are different to each other. It can thus be stated that a layer within a macro cell refers to a particular frequency at which a small cell located at least partially within the coverage of the macro cell operates.

In the above, reference is made to a PCell and to an SCell. These terms are usually used in connection with carrier aggregation techniques. In particular, a PCell is a cell that manages a radio resource control connection with a particular user apparatus. The PCell is configured to operate on a primary component carrier. A component carrier may be generally considered to be a collection of frequencies (contiguous and/or non-contiguous) over which carrier aggregation is employed). Cells other than the PCell that have a coverage area at least partially located within the coverage area of the PCell are known as SCells. SCells transmit on secondary component carriers (component carriers that are different to the primary component carrier). The PCell may offload certain communications from the user apparatus to the network to the SCell, so that the user apparatus communicates with the SCell for those certain communications. According to 3GPP technical standard TS 36.300, when carrier aggregation is configured, a user apparatus only has one radio resource control connection with the network. At radio resource control connection establishment/re-establishment/handover, one serving cell provides the non-access stratum mobility information (e.g. the tracking area identity, TAI), and at radio resource control connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC). Depending on the capabilities of a user apparatus, Secondary Cells (SCells) can be configured to form, together with the PCell, a set of serving cells. In the downlink, the carrier corresponding to an SCell is a Downlink Secondary Component Carrier (DL SCC) while in the uplink it is an Uplink Secondary Component Carrier (UL SCC). PCell and SCell terms are used as examples and should not be regarded as limiting. Other examples could be PCell and PsCell (primary SCell) or simply just two cells providing service or acting as access points to the user apparatus.

Currently the control signalling related to the management of the small cells for handovers, carrier aggregation and/or dual connectivity is carried out on the PCell (as part of the radio resource control signalling). This process is illustrated with respect to FIG. 4. Communications related to handover, carrier aggregation and dual connectivity are specified in 3GPP technical releases 36.331, 36.321 and 36.133.

Figure 4:
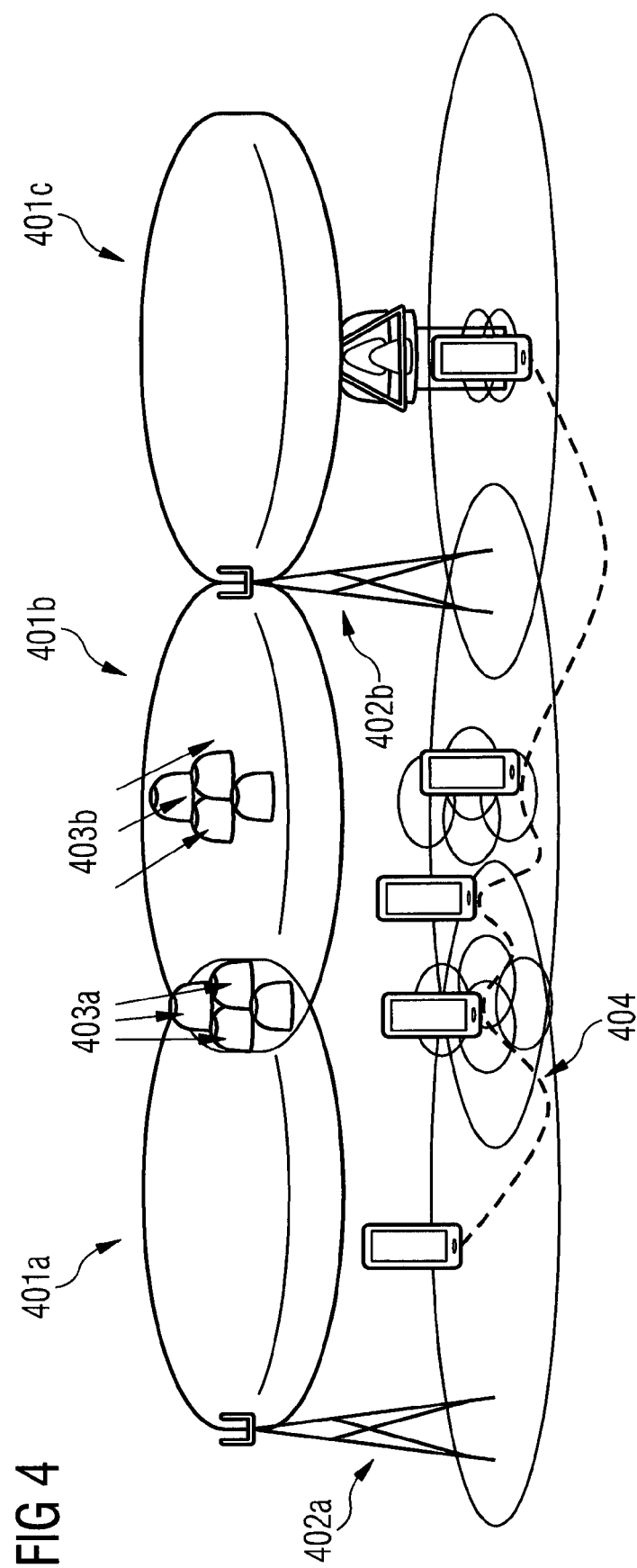
FIG. 4 shows a schematic diagram of an example communication system.

FIG. 4 depicts three Primary Cells (Pcells) 401a-401C, one of which (401a) being provided by base station 402a and the remaining two (401b, 401c) being provided by base station 402b. Each cell is depicted as providing a substantially oval-shaped coverage area. The coverage provided by Pcells 401a and 401b overlap at an extreme of their respective coverage areas, with the other extreme originating from their respective base stations 402a, 402b. Oval representations of the coverage provided by small cells 403a, 403b are also depicted, with small cells labelled as 403a being located in the overlap between Pcells 401a and 401b, and small cells labelled as 403b being located within the coverage of Pcell 401b. A potential path of a user apparatus 404 is traced out below the depicted coverage.

In this example of FIG. 4, the macro deployment (which ensures basic connectivity throughout the network coverage area with a minimum experienced user performance) is boosted with a number of small cells 403a, 403b for increased user experience at hotspot areas. Such areas could be, for example, areas where lot of people are usually concentrated (downtown areas, shopping malls, stadiums etc.), and/or cell edge areas (to ensure cell edge user apparatus performance). Additionally the housing areas may be additionally boosted with indoor-located small cells to ensure a good indoor user experience at home premises.

As the user apparatus moves throughout the network, the user apparatus is configured to measure and report on detected layers for small cells in order to report detected cells to the network apparatus controlling any small cell-based operations. Based on the received reports, the network apparatus may then use the small cells (as explained above) to ensure satisfactory user experience by employing various procedures, for example, handover, carrier aggregation, dual connectivity, etc. The strict network control of these various procedures involves radio resource management signalling. As the number of layers and cells increase, the amount of radio resource management signalling likewise increases.

Other small cell technologies are now described.

New technologies for operating in an unlicensed band, such as Licensed-Assisted Access (LAA), stand-alone LTE deployment in an unlicensed band (potentially combined with, for example, use of dual connectivity or physical uplink control channel SCell with LAA), are being investigated and worked on. Currently, it is proposed with LAA that a connection via a licensed band is maintained while using the unlicensed band. According to 3GPP Technical Standard TS 36.300, In dual connectivity, the configured set of serving cells for a user apparatus consists of two subsets: the Master Cell Group (MCG) containing the serving cells of the MeNB, and the Secondary Cell Group (SCG) containing the serving cells of the SeNB Technology for enhancing coverage, capacity and mobility within a network, such as MulteFire, is also under development. This provides adding yet another dimension of freedom in the use of LTE in small cell-deployment.

MulteFire is an LTE-based technology for (small) cells operating solely in unlicensed spectrum using the benefits known from LTE in unlicensed domain.

The target of the MulteFire technology is to create a new telecommunications system where LTE radio technology is used on an unlicensed radio band. Some embodiments may support regular LTE by extending LTE service into unlicensed radio band using for example a so-called MulteFire radio. However it should be appreciated that embodiments are not limited to a LTE type of cellular service, and could support e.g., a 3G radio service or a 5G radio service. Alternatively or additionally MulteFire may provide local internet connectivity and/or mobility within the MulteFire network. In some embodiments, this may be independent of any cellular operator and/or subscriber information module (SIM) card presence.

As mentioned above, small cell scenarios and technologies are considered useful for offloading communications for and/or from a user apparatus from one network apparatus to another apparatus. For example, offloading opportunities may be exploited, such as when user apparatus is handed over to a smaller cell within a larger cell to utilize the resources of the larger cell more efficiently and/or to provide an improved quality of service to a user apparatus.

Additional mechanisms have been introduced into the large cell/small cell concept for further improving efficiency and/or resource usage of a larger (and/or primary) cell. For example, carrier aggregation has made it possible to use small cells for transmitting downlink (DL) through downlink cell aggregation, thus improving the load distribution on cells throughout a network. Uplink transmissions on the SCell (described further below) has also been introduced via physical uplink control channel on SCell (Rel-13). Dual connectivity (DC) has also been introduced, which enables a user apparatus to be simultaneously connected to both a larger (macro) cell and a small. Dual connectivity mainly differs from carrier aggregation by having a separate uplink transmission channel in the PSCell (physical uplink control channel PSCell) and having less strict timing requirements between PCell and PSCell (the PSCell and PCell are described further below). Physical uplink control channel SCell has recently been introduced without changing this principle. The provision of any of these functions depends on the user apparatus capability.

Common to all of these mechanisms is that they are all under tight network control in terms of measurement support, configuration and activation. In order to provide the network with information for making decisions concerning configuring the user apparatus with additional cells (carrier aggregation and/or dual connectivity) or handover, the user apparatus is configured by the network to send measurement reports to the network. Such measurement reports deliver information to the network about which cells are in the vicinity of the user apparatus, which allows the network to select a target cell among the measured/reported target cells as a handover target and/or a target for use in carrier aggregation/dual connectivity configurations.

Small cell technology and efficient small cell offloading is expected to substantially increase the data throughput for both E-UTRAN and 5G. Therefore, use of small cells for offloading either by use of improved procedures based on existing methods like Carrier Aggregation and/or Dual Connectivity are seen as important features.

The present inventors have realised that as the number of small cells and potentially also the number of layers on which the cells could be available increases, the signalling burden caused by having a tight network control of the cells, starts to be significant. In the long term (with a large amount of component carriers (e.g. introduction of LAA on band 46) and the decrease in the size of the small cells supported (see e.g. 3GPP Technical Release 38.913)), the control signalling from the macro cell base station may become significant. This results in an inefficient use of network resources.

Further, the network apparatus is arranged to configure the user apparatus and/or smaller cells for communications with each other. Such configurations may utilize extra signaling between the elements located within the system.

The network apparatus may use two basic approaches when configuring the user apparatus for carrier aggregation and/or dual connectivity.

1) The network apparatus uses blind configuration of SCells. This method is, in practise, limited to co-located deployments (e.g. PCell and SCell deployments) for efficiency reasons; and 2) The network apparatus relies on known cell configurations and on user apparatus assistance. Through measurement reports from the user apparatus, the network apparatus gains knowledge as input for configuring the user apparatus with, for example, SCells.

There has been an ongoing effort related to lowering the signaling load by pre-configuration of SCells for user apparatus for use in carrier aggregation and dual connectivity, whilst also reducing set-up delays for a user apparatus connecting to a secondary cell.

To reduce the setup delays in setting up one of the secondary or additional cells as a primary cell (a Primary-Secondary Cell, PSCell) for a particular user apparatus, the network apparatus assigns one cell radio network temporary identifier (C-RNTI) for the user apparatus that is applicable in one or a plurality of clustered small cells on the small cell carrier.

C-RNTI is used by a user apparatus to identify a particular radio resource control (RRC) connection in a cell. C-RNTI is used to allocate radio resources to a user apparatus e.g. with downlink assignment, uplink grants, physical downlink control channel orders and also for uplink transmission of physical uplink shared channel/physical uplink control channel data in order to correctly identify the user apparatus. For the uplink, E-UTRAN can dynamically allocate resources (for example, physical resource blocks and modulation and coding schemes) to user apparatus' at each time transmission interval via the C-RNTI on the physical downlink control channel(s). Corresponding dynamic allocation may be performed on the downlink. In addition, C-RNTI is used in scrambling as part of the cyclic redundancy check. Examples of the way in which the C-RNTI may be used is described in 3GPP Technical Specification TS 36.213. When carrier aggregation is configured, the same C-RNTI applies to all serving cells.

Currently all user apparatus specific addressing in LTE in Connected mode is done using one C-RNTI. Rel-8 introduced the situation in which a user apparatus only has a PCell. Rel-10 introduced Carrier Aggregation, in which downlink transmissions from multiple cells can be combined in order to provide enhanced downlink bandwidth, which still using a single C-RNTI in the PCell and configured SCells. Similarly, dual connectivity utilizes a single C-RNTI value, i.e. Dual Connectivity was introduced mainly differing from carrier aggregation by having a separate uplink in the PSCell and having less strict timing requirements between PCell and PSCell. A physical uplink control channel on the SCell has recently been introduced without changing this principle Thus once a user apparatus enters an area of small cells, it detects a configured cell or any cell and monitors the cell for transmissions made for it using the C-RNTI. If addressed by the C-RNTI, the user apparatus may receive full configuration information necessary for operating in the cell (whether the cell is to be operated as a PSCell, SCell or the like). The full configuration will be received by the user apparatus from the monitored cell (e.g. from the PSCell). By this approach, it is not necessary to configure the monitored cell from the (macro) PCell (e.g. based on user apparatus measurement report) each time, which would help in reducing the delay in using the cell e.g. PSCell.

As mentioned above, the current features supporting use of resources from multiple cells for one user apparatus as defined, for example, in carrier aggregation and dual connectivity rely on tight control from the PCell and the use of common C-RNTI for scheduling. When moving towards a more flexible use of larger amount of small cells for offloading in the near future, such an approach would lead to reserving a given C-RNTI in many cells and potentially also in many cells in multiple layers. The inventors have realised that this is likely to limit network flexibility and, particularly as more networks are deployed (potentially even including cells from other network operators or cell deployment owners or controllers), the present (semi-)static and inflexible reservation scheme of C-RNTIs seems non-optimal.

Reducing the signalling load impact on the PCell and the related user apparatus power consumption due to the reduced signalling load is clearly beneficial. At the same time, it is important to ensure that the offloading opportunities and network control is not sacrificed, as is latency.

In the following a mechanism for a more flexible approach is proposed to address at least one of the above-mentioned issues.

The following mechanisms relate to actions performed by a network apparatus (such as a base station/eNB/access point/radio network controller or any entity acting as a primary cell) in assigning (or reserving) a plurality of identifiers for addressing a user apparatus within at least one cell (such as a base station/eNB/access point/radio network controller or any entity acting as a secondary cell) located at least partially in a cell controlled by the network apparatus. The following mechanisms also relate to actions performed by a user apparatus in being assigned such a plurality of identifiers, and to network apparatuses (such as a base station/eNB/access point/radio network controller or any entity acting as a secondary cell) associated with the at least one cell that may use at least one of a plurality of the reserved user identifiers.

The plurality of identifiers is assigned such that they each have a different applicability to each other. For example, one of the plurality of identifiers may uniquely identify a user apparatus within a single layer of a single small cell located within the network-controlled cell. As another example, one of the plurality of identifiers may uniquely identify a user apparatus within a single layer of a plurality of small cells located within the network-controlled cell. The plurality of small cells in this latter example may correspond to all of the small cells located within the network controlled cell or may correspond to only a portion of all of the small cells located within the network controlled cell or it may correspond to any small cell located within a single layer. Other potential applications of this identifier are discussed below, in specific aspects.

Figure 5:
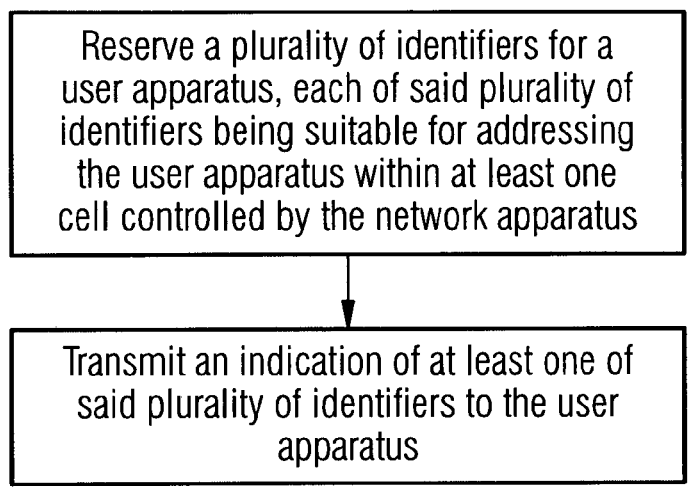
FIG. 5 shows a flow chart depicting potential steps to be employed by an algorithm executing on a network apparatus.

Potential actions of the network apparatus are described in relation to FIG. 5. These actions may describe an algorithm that may be effected when computer code stored in at least one memory of the network apparatus is executed on at least one processor of the network apparatus.

At 501, a network apparatus is configured to reserve a plurality of identifiers for a user apparatus, each of said plurality of identifiers being for addressing the user apparatus within a given coverage area e.g. the coverage area of a cell controlled by the network apparatus. An identifier may indicate or otherwise address the user apparatus over the radio interface. The identifier may be used at the user apparatus e.g. at the MAC layer or lower. Each of the plurality of identifiers may be used to address the user apparatus at the same OSI level as the other identifiers of the plurality of identifiers. In other words, the reserved identifiers are interchangeable with each other within a physical layer and/or a data link layer.

When reserving the plurality of identifiers, the network apparatus may be configured to reserve identifiers in a plurality of cells which could be located within the cell controlled by the network apparatus. The term "located" in this sense means that at least part of the coverage area of the plurality of cells overlaps with a part of the coverage area of the cell controlled by the network apparatus. Where references are made throughout the following to a cell being located in a coverage area of a cell controlled by the network apparatus (partially or otherwise), it is understood that these examples also apply to cases in which the cell is simply controlled by the network apparatus (i.e. without being located in the coverage area of a cell controlled by the network apparatus).

The identifiers may be dedicated identifiers for the user apparatus within at least one of the plurality of cells. As such, the dedicated identifiers uniquely identify the user apparatus within at least one of the plurality of cells, such that the user apparatus may be uniquely addressed by a dedicated identifier. The identifier may only be dedicated for that identifier within a particular cell, and/or portion of cells of the plurality of cells or within a frequency layer. The identifier may only be dedicated for that identifier within a particular cell, and/or portion of cells of the plurality of cells at a particular operating frequency and/or range of operating frequencies or within any cell of a frequency layer. The phrase "range of operating frequencies" is intended to encompass a secondary component carrier of an SCell, and so may refer to contiguous frequencies and/or non-contiguous frequencies, depending on the network being deployed. It may also refer to any frequency layer as indicated by the network.

Of the plurality of cells located within the coverage area of the network-controlled cell, at least one of the identifiers reserved for the plurality of cells located within the cell controlled by the network apparatus may not identify the user apparatus within every cell of the plurality of cells. In other words, different ones of the reserved identifiers may be used for addressing the user apparatus in different cells controlled by the network apparatus. At least one of the reserved identifiers may be reserved for identifying the user apparatus in only some cells located within the coverage area of network-controlled cell, wherein the same identifier may be used to address the user apparatus across said some cells. For example, a particular reserved identifier may only identify a particular user apparatus within a single cell located within the coverage area of the network-controlled cell. Further, a particular reserved identifier may only identify a particular user apparatus within a portion of the plurality of cells located within the coverage area of the network-controlled cell (the portion being a non-integer).

Conversely, a particular reserved identifier may identify a particular user apparatus across all of the cells located within the coverage area of the network-controlled cell and/or frequency layer.

Each of the assigned plurality of identifiers may be associated with a respective operating frequency and/or operating frequency range of at least one of said plurality of cells (including all of the plurality of cells). The operating frequency and/or operating frequency range may be a component carrier formed from carrier aggregation. Each of the assigned plurality of identifiers may be associated with a (unique or non-unique) respective operating frequency and/or range of operating frequencies of the network-controlled cell, such that the identifier only identifies the user apparatus within that layer.

The reserving may be performed in response to a determination that the user apparatus requires an identifier for being addressed in a particular cell located within the cell controlled by the network apparatus. The determination may be performed in response to a received request from a user equipment for network access. A suitable such request is a radio resource control request from a user apparatus.

The reserving may reserve the plurality of identifiers in response to the same determination that the user apparatus requires an identifier, such that the plurality of identifiers are reserved by the network apparatus at the same time (and/or during the same operation).

The reserving of the plurality of identifiers may be distributed in time, such that the network apparatus makes a plurality of determinations that the user apparatus requires an identifier and reserves at least one identifier in response to each determination. In other words, at least some of the plurality of identifiers may be reserved by the network apparatus at a different time/in a different operation to others of the plurality of identifiers.

When the reserved identifiers are reserved during the same operation, the reserved identifiers may be assigned to respective individual and/or groups of cells of the plurality of cells also as part of the same operation, such that each reserved identifier is almost immediately assigned to a respective individual cell and/or group of cells. The operating frequency and/or range of operating frequencies may in which each reserved identifier is applicable may also be assigned at this time.

At least one of the plurality of cells may be a small cell, such as a pico cell and/or a femtocell. At least one of the plurality of cells may be a macro cell. The plurality of cells may be closely located together. The plurality of cells may form an ultra-dense network.

The operator of the network apparatus may not be the operator of at least one of the plurality of cells.

At 502, the network apparatus is configured to transmit at least one indication of at least one of said plurality of identifiers to the user apparatus.

The network apparatus may be configured to make a single transmission that indicates of all of the reserved identifiers. The network apparatus may make a single transmission that indicates only a portion of the reserved identifiers (the portion being having a non-integer value). The network apparatus may be configured to make a single transmission that indicates only one of the reserved identifiers. The network apparatus may be configured to select between these alternatives in dependence on the structure of the network and the application of a particular assigned identifier. For example, if the identifiers are reserved for single cells or relatively small clusters of cell (given the total number of cells in a particular network-controlled cell), the transmission of multiple identifiers may be more likely than if an identifier is assigned for a relatively large cluster of cells (as fewer handovers are expected in this second scenario).

The network apparatus may also transmit information indicating a situation in which the identifier may be used. For example, if a particular reserved identifier is to be used with a particular cell/group of cells and/or at a particular layer, the network apparatus may provide information relating to the identity of those cell(s) and/or operating frequenc (y/ies). This may be transmitted at the same time as the indication of the identifier.

The network apparatus may transmit the above-described indications and/or information to at least one of: at least one cell of the plurality of cells; and the user apparatus. This transmission may be performed in response to a received communication requesting such an identifier. The received communication may originate from at least one of: at least one cell of the plurality of cells; and the user apparatus. Regardless of where the request originated, the network apparatus may be configured to transmit the above-described indications and/or information to at least one of: at least one cell of the plurality of cells; and the user apparatus.

Figure 6:
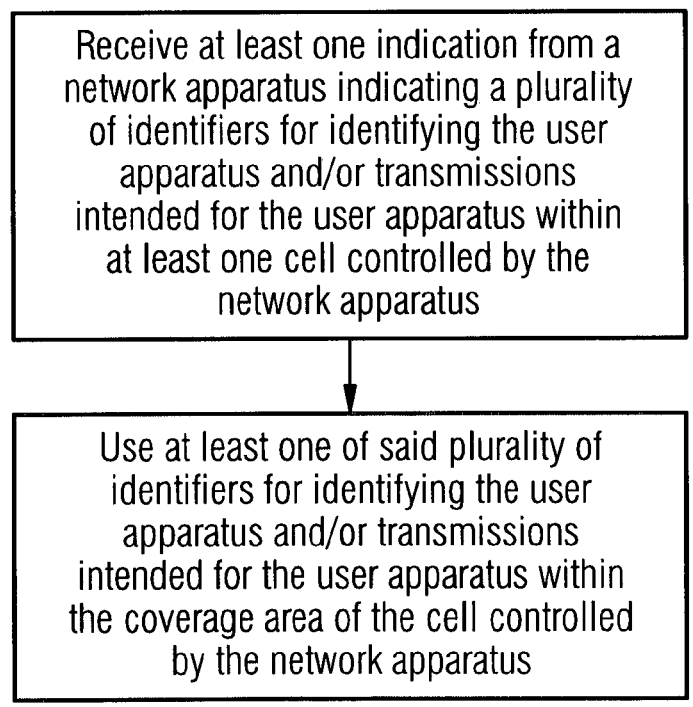
FIG. 6 shows a flow chart depicting potential steps to be employed by an algorithm executing on a user apparatus.

Potential actions of the user apparatus are described in relation to FIG. 6. These actions may describe an algorithm that may be effected when computer code stored in at least one memory of the user apparatus is executed on at least one processor of the user apparatus.

At step 601, the user apparatus is configured to receive at least one indication from a network apparatus indicating a plurality of identifiers for identifying the user apparatus within a coverage area of a cell controlled by the network apparatus.

At step 602, the user apparatus is configured to use at least one of said plurality of identifiers for identifying the user apparatus within the coverage area of the cell controlled by the network apparatus.

The user apparatus may be configured to use at least one of said plurality of identifiers for identifying the user apparatus (and/or transmissions for the user apparatus) within a cell (i.e. a single cell) controlled by the network apparatus. The user apparatus may be configured to use at least one of said plurality of identifiers for identifying the user apparatus (and/or transmissions for the user apparatus) within a plurality of cells controlled by the network apparatus. The plurality of cells may be a portion of total number of cells controlled by the network apparatus (wherein the portion has a non-integer value).

The user equipment may use the identifier to determination configuration information for at least one cell of the plurality of cells.

The comments made above in respect of the properties of the identifier also apply in respect of the user apparatus of FIG. 6.

Potential actions of a network apparatus associated with one of the small cells (i.e. a cell having a coverage area that overlaps with at least part of the coverage area of the network-controlled cell defined above) is outlined below in relation to FIG. 7. These actions may describe an algorithm that may be effected when computer code stored in at least one memory of the network apparatus is executed on at least one processor of the network apparatus.

At step 701, the network apparatus of the small cell is configured to receive at least one indication from another network apparatus indicating a plurality of identifiers for identifying a user apparatus within a coverage area of a cell controlled by the another network apparatus.

At step 702, the network apparatus of the small cell is configured to use at least one of said plurality of identifiers for identifying the user apparatus within a coverage area of the cell controlled by the network apparatus. For example, the network apparatus of the small cell may be configured to schedule transmissions for the user apparatus in dependence on the at least one of said plurality of identifiers. The identifier may be associated with a particular carrier (or layer) used by the network apparatus such that the identifier uniquely identifies the user apparatus on that particular carrier.

Figure 7:
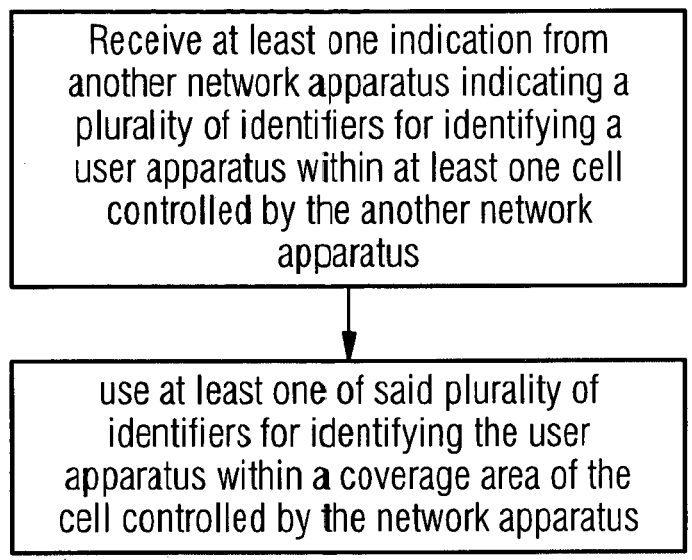
FIG. 7 shows a flow chart depicting potential steps to be employed by an algorithm executing on a network apparatus.

The comments made above in respect of the properties of the identifier also apply in respect of the network apparatus of FIG. 7.

Further, each of the plurality of reserved identifiers described above may, in addition to identifying a particular user apparatus, also be used to identify a particular radio resource control connection and/or for scheduling decisions.

The plurality of assigned identifiers may be C-RNTIs. Functions/properties of this type of identifier are defined herein below. It is understood that although the following discussion takes place in the context of C-RNTIs and their function, that such functions are not limited to only C-RNTIs as identifiers and consequently the following discussion has a wider applicability.

Each C-RNTI can be assigned to one or more cells and/or one or more layers (component carriers). The C-RNTI assignment may be performed by a network apparatus using signalling such as radio resource control signalling or similar. The assignment could be done such that a given C-RNTI is assigned to a number of (or all) cells on a specific layer e.g. using a list of Physical Cell Identities (PCIs) to enable the user apparatus to identify the list of cells for which a given C-RNTI applies. A C-RNTI could also be assigned to cells deployed in unlicensed band such as, for example, LAA cells or MulteFire.

Examples of broad applicability of C-RNTIs could be a 'cluster C-RNTI' (or Cc-RNTI) in which a given C-RNTI is used for a group/cluster of cells on a given carrier. Another example could be to indicate to a particular user apparatus that that user apparatus shall use paging C-RNTI on a given carrier (over one, all, or a portion of the plurality of cells). In one example the paging could be used independently from the current user apparatus state (Idle mode, Connected mode or similar).

As a general note, C-RNTI could be understood in broad terms as an identifier used to address a user apparatus in a given cell and is not necessarily limited to C-RNTI as it is known and used currently in LTE. Other forms of user identifiers could be used, when restricted to LTE, as long as that identifier is identifying a user apparatus connection.

The following example discusses the presently described technique in the context of the LTE radio resource control Connected mode as a non-limiting example of the presently described techniques. The claimed invention is not-limited to this example.

Previously, the user apparatus, when operating in carrier aggregation type of operation, would have transmitted an access request to the PCell. In response to the receipt of this access request, the PCell sends the configuration of a particular SCell to the user apparatus, including a C-RNTI value. After the user apparatus receives this configuration, the additional SCell downlink resources can be used.

Each time the SCell is changed (as the user apparatus moves through the network), the user apparatus requires a new SCell configuration. In dense deployments this might happen frequently, which causes increased signalling. In some scenarios, the SCell is actively used for data transmission. Therefore, to keep the latency low, the network of the PCell always configures the SCell.

According to the presently described techniques, it is proposed that the user apparatus can be assigned several C-RNTIs in response to the initial receipt of the access request. In general the same C-RNTI would potentially not be used in other cells than, for example, the PCell. Instead different methods of using C-RNTI are introduced. Examples of these different methods include:

- An indication to use same C-RNTI as in PCell (but only for specifically assigned cells);
- An assignment of a specific C-RNTI for a specific purpose;
- An assignment of a cluster C-RNTI for use in a group of cells (e.g., for offloading on a given carrier). In this case, the C-RNTI may be labelled as a Cell-cluster-RNTI (or Cc-RNTI);
- An assigned C-RNTI for a specific carrier (all cells within a Pcell);
- An assigned C-RNTI for LAA network apparatus;
- An assigned C-RNTI for use in apparatus executing in accordance with MulteFire; and
- A use of a paging C-RNTI (e.g. user apparatus listens to paging C-RNTI of a given carrier).

As a general note, reserving a C-RNTI for a group of cells—e.g. cluster of cells on a given carrier, may be seen as limiting the network flexibility in terms of reserving a C-RNTI up front across multiple cells. However, this configuration is simply one C-RNTI per UE which is valid for multiple cells. As mentioned above, the name of such an identifier could be: Cc-RNTI (Cell cluster RNTI).

The Cc-RNTI need not be the same as in C-RNTI actively used in the PCell. This is especially useful in the case where the potential offloading cells (SCell in licensed or unlicensed) are configured up front in a more relaxed manner (e.g. reduced SCell configuration information is sent to user apparatuses) and using less strict network control. For example, in one situation the user apparatus would be assigned with a Cc-RNTI for a cluster of cell or for all cells on carrier. Whenever the network wishes to reach the user apparatus in one of those cells the network simply addresses the user apparatus using the Cc-RNTI. But during the time when the user apparatus is not actively being scheduled, there wouldn't be a need for network to configure or reconfigure any SCells as the user apparatus would be aware of which Cc-RNTI to monitor within the group of cells.

Thus in the presently described embodiments, there is no need for a controlling network apparatus (such as a PCell) to reserve a C-RNTI over multiple layers or to configure/reconfigure SCell per cell change.

Further, as mentioned above, in the future, when considering carrier aggregation of up to 32 component carriers and including SCell deployed in both licensed and unlicensed band, it becomes more likely that not all cells are controlled by same operator (deployer) as the PCell. Therefore, removing the single C-RNTI principle enables more flexibility (and also enables multiple C-RNTIs to be assigned to a single user equipment).

As another example, a macro layer and at least one other layer having a dense small cell deployments with some cluster of SCells (e.g. FIG. 3 and/or FIG. 4) is considered. This cluster of cells could be, for example, cells deployed in unlicensed band using LAA or the MulteFire technology. For simplicity, the cells in the cluster (e.g. the SCells) may be activated and the user apparatus may be configured to monitor the cell in the active cluster of cells in the downlink (e.g. for a physical downlink control channel Order). If the user apparatus moves such that a there is a need to change to another small cell (e.g. on the unlicensed band), there is no need to reconfigure the user apparatus with new SCell configuration, and no risk of C-RNTI collision with PCell.

In the above, the term "coverage" has been used in reference to the coverage area of a cell. This term may denote only the direct radio reach of a network apparatus that transmits to define that cell. However, it is understood that the use of this term may also denote the maximum total reach of that network apparatus, such that any other network apparatus which may be instructed to use one of the reserved plurality of identifiers for addressing a particular user equipment within the cell is considered to be within the total maximum reach of that network apparatus. This is because the operational radio range of a cell may vary with the current operating power of transmissions for the associated base station and/or user apparatus and so may vary in time. In the system of carrier aggregation, any network apparatus that is configured to function as an SCell to a network apparatus operating as a PCell is considered to be within the coverage area of the PCell.

Throughout the above, the terms "network apparatus" and "cell" are used interchangeably, as a network apparatus may define a coverage area of at least one cell through the maximum range of its transmissions.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone LTE networks, similar principles maybe applied in relation to other examples of standalone 3G, LTE or 5G networks. It should be noted that other embodiments may be based on other cellular technology other than LTE or on variants of LTE. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched to and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A network apparatus, comprising:
   at least one processor; and
   at least one memory comprising computer code that, when executed by the at least one processor, causes the apparatus at least to:

determine that the user apparatus requires an identifier for being addressed in a particular cell controlled by the network apparatus;

reserve, in response to said determination, a plurality of identifiers for a user apparatus, each of said plurality of identifiers being suitable for addressing the user apparatus within at least one cell controlled by the network apparatus; and transmit an indication of at least one of said plurality of identifiers to the user apparatus, wherein at least one of the identifiers reserved for the plurality of cells controlled by the network apparatus identifies the user apparatus at a particular operating frequency of the plurality of cells, such that the identifier is used to address the user apparatus in the plurality of cells.

2. The network apparatus as claimed in claim 1, wherein at least one of the identifiers reserved for the plurality of cells controlled by the network apparatus does not identify the user apparatus within every cell controlled by the network apparatus.

3. The network apparatus as claimed in claim 1, wherein the executed computer code further causes the network apparatus to:

receive a request for a radio resource control connection prior to said determining; and perform said determining in dependence on the received request.

4. A user apparatus, comprising:

at least one processor; and at least one memory comprising computer code that, when executed by the at least one processor, causes the user apparatus at least to:

receive at least one indication from a network apparatus indicating a plurality of identifiers for identifying the user apparatus or transmissions intended for the user apparatus within at least one cell controlled by the network apparatus, wherein the plurality of identifiers are reserved in response to a determination that the user apparatus requires an identifier for being addressed in a particular cell controlled by the network apparatus; and use at least one of said plurality of identifiers for identifying the user apparatus or transmissions intended for the user apparatus within one or more of the cells controlled by the network apparatus, wherein at least one of the plurality of identifiers is reserved for a plurality of cells having a coverage area that overlaps with at least a part of a coverage area of a cell controlled by the network apparatus for identifying the user apparatus at a particular operating frequency of the plurality of cells, such that the identifier is used to address the user apparatus in the plurality of cells.

5. A method, comprising:

determining that the user apparatus requires an identifier for being addressed in a particular cell controlled by the network apparatus;

reserving, in response to said determination, at a network apparatus a plurality of identifiers for a user apparatus, each of said plurality of identifiers being suitable for addressing the user apparatus within at least one cell controlled by the network apparatus; and transmitting from the network apparatus an indication of at least one of said plurality of identifiers to the user apparatus, wherein at least one of the plurality of identifiers is reserved for a plurality of cells having a coverage area that overlaps with at least a part of a coverage area of a cell controlled by the network apparatus for identifying the user apparatus at a particular operating frequency of the plurality of cells, such that the identifier is used to address the user apparatus in the plurality of cells.

6. The method as claimed in claim 5, wherein at least one of the identifiers reserved for the plurality of cells controlled by the network apparatus does not identify the user apparatus within every cell controlled by the network apparatus.

7. A computer program embodied on a non-transitory computer readable medium, the computer program comprising a set of instructions, execution of which by a processor configures an apparatus to at least to perform the method of claim 5.

8. A method, comprising:

receiving at a user apparatus at least one indication from a network apparatus indicating a plurality of identifiers for identifying the user apparatus or transmissions intended for the user apparatus within at least one cell controlled by the network apparatus, wherein the plurality of identifiers are reserved in response to a determination that the user apparatus requires an identifier for being addressed in a particular cell controlled by the network apparatus; and using at least one of said plurality of identifiers for identifying the user apparatus or transmissions intended for the user apparatus within one or more of the cells controlled by the network apparatus, wherein at least one of the plurality of identifiers is reserved for a plurality of cells having a coverage area that overlaps with at least a part of a coverage area of a cell controlled by the network apparatus for identifying the user apparatus at a particular operating frequency of the plurality of cells, such that the identifier is used to address the user apparatus in the plurality of cells.

\* \* \* \* \*